United States Patent
Braune et al.

(10) Patent No.: US 11,514,565 B2
(45) Date of Patent: Nov. 29, 2022

(54) SECURING A MONITORED ZONE COMPRISING AT LEAST ONE MACHINE

(71) Applicant: SICK AG, Waldkirch (DE)

(72) Inventors: Ingolf Braune, Waldkirch (DE); Armin Hornung, Waldkirch (DE); Matthias Neubauer, Waldkirch (DE); Shane Macnamara, Waldkirch (DE)

(73) Assignee: SICK AG, Waldkirch (DE)

( * ) Notice: Subject to any disclaimer, the term of this patent is extended or adjusted under 35 U.S.C. 154(b) by 820 days.

(21) Appl. No.: 16/414,155

(22) Filed: May 16, 2019

(65) Prior Publication Data
US 2019/0362487 A1    Nov. 28, 2019

(30) Foreign Application Priority Data
May 22, 2018  (EP) .................................. 18173619

(51) Int. Cl.
*G06T 7/00* (2017.01)
*G06T 7/593* (2017.01)
(Continued)

(52) U.S. Cl.
CPC ............ *G06T 7/0004* (2013.01); *G06T 7/593* (2017.01); *G06V 20/52* (2022.01); *H04N 13/207* (2018.05);
(Continued)

(58) Field of Classification Search
None
See application file for complete search history.

(56) References Cited

U.S. PATENT DOCUMENTS 6,477,260 B1 *  11/2002  Shimomura .............. G06T 7/74
                                                 382/106
8,830,224 B2 *   9/2014  Zhao ...................... A61B 34/20
                                                 382/218
(Continued)

FOREIGN PATENT DOCUMENTS

EP    1933167 A2    6/2008
EP    2275990 B1    9/2012
(Continued)

OTHER PUBLICATIONS

Liu, Suolan, et al. "A Computationally Efficient Denoising and Hole-Filling Method for Depth Image Enhancement" Proc. of SPIE; vol. 9897; 2016.
(Continued)

*Primary Examiner* — Stefan Gadomski
(74) *Attorney, Agent, or Firm* — Nath, Goldberg & Meyer; Jerald L. Meyer

(57) ABSTRACT

A safe optoelectronic sensor is provided for securing a monitored zone comprising at least one machine, wherein the sensor has at least one light receiver for generating a received signal from received light from the monitored zone and a control and evaluation unit that is configured to determine distances from objects in the monitored zone from the received signal, and to treat gaps, i.e. safety relevant part regions of the monitored zone in which no reliable distance can be determined, as an object at a predefined distance. The predefined distance here corresponds to a height for securing against reach over.

17 Claims, 3 Drawing Sheets

Figure 1:
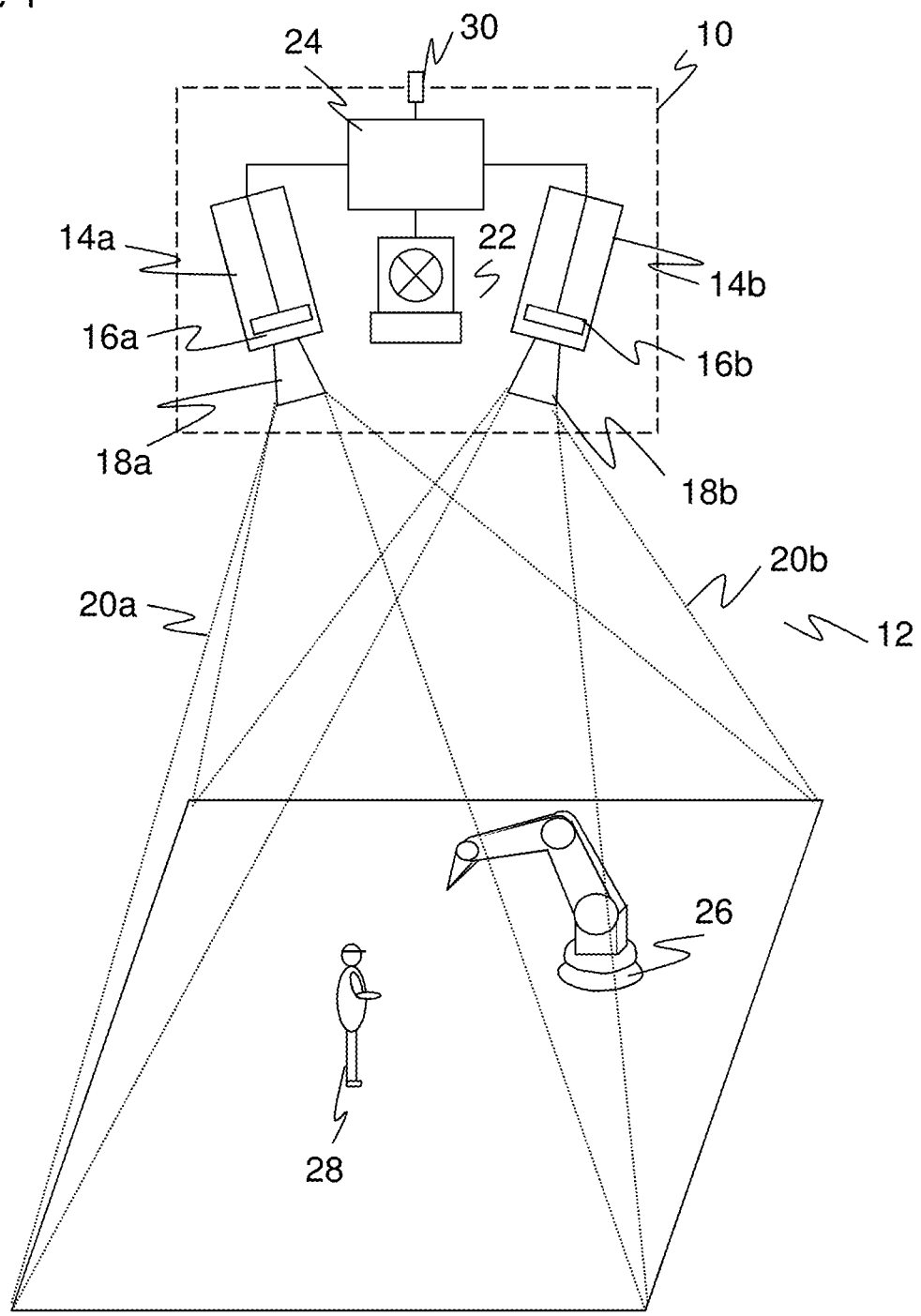

(51) Int. Cl.
*H04N 13/207* (2018.01)
*G06V 20/52* (2022.01)
*H04N 13/271* (2018.01)
*H04N 13/00* (2018.01)

(52) U.S. Cl.
CPC ........... *G06T 2207/10012* (2013.01); *G06T 2207/10028* (2013.01); *G06T 2207/30232* (2013.01); *G06V 2201/06* (2022.01); *H04N 13/271* (2018.05); *H04N 2013/0081* (2013.01)

(56) References Cited

U.S. PATENT DOCUMENTS

| | | | | |
|---|---|---|---|---|
| 8,933,593 | B2* | 1/2015 | Haberer | F16P 3/14 307/326 |
| 9,346,091 | B2* | 5/2016 | Hufnagel | B21D 55/00 |
| 10,212,408 | B1* | 2/2019 | Pappas-Katsiafas | G06T 5/50 |
| 2003/0076224 | A1* | 4/2003 | Braune | F16P 3/142 340/500 |
| 2003/0168581 | A1* | 9/2003 | Hipp | G01S 17/87 250/221 |
| 2003/0222983 | A1* | 12/2003 | Nobori | G06T 7/97 348/E7.086 |
| 2005/0232488 | A1* | 10/2005 | Lee | G06V 20/69 382/133 |
| 2005/0265596 | A1* | 12/2005 | Lohmann | G01S 17/04 382/153 |
| 2007/0194944 | A1* | 8/2007 | Galera | F16P 3/14 340/686.6 |
| 2008/0173831 | A1* | 7/2008 | Wuestefeld | G01V 8/20 250/551 |
| 2009/0015663 | A1* | 1/2009 | Doettling | F16P 3/00 348/46 |
| 2010/0271047 | A1* | 10/2010 | Soerensen | G01V 3/088 324/658 |
| 2011/0001799 | A1* | 1/2011 | Rothenberger | G06T 7/50 348/47 |
| 2011/0001957 | A1* | 1/2011 | Braune | G01S 17/04 356/4.01 |
| 2011/0044505 | A1* | 2/2011 | Lim | G06V 20/52 382/103 |
| 2011/0050878 | A1* | 3/2011 | Wells | H04N 7/181 348/86 |
| 2011/0060462 | A1* | 3/2011 | Aurnhammer | B25J 9/1674 700/255 |
| 2011/0298579 | A1* | 12/2011 | Hardegger | F16P 3/14 340/3.1 |
| 2012/0074296 | A1* | 3/2012 | Hammes | G06V 10/141 250/205 |
| 2012/0182419 | A1* | 7/2012 | Wietfeld | G06T 7/13 348/137 |
| 2012/0218564 | A1* | 8/2012 | Wustefeld | G01S 7/497 356/614 |
| 2012/0293625 | A1* | 11/2012 | Schneider | F16P 3/142 348/46 |
| 2012/0327190 | A1* | 12/2012 | Massanell | B25J 9/1676 348/46 |
| 2013/0044187 | A1* | 2/2013 | Hammes | H04N 13/254 348/46 |
| 2013/0076866 | A1* | 3/2013 | Drinkard | G06T 7/596 348/47 |
| 2013/0094705 | A1* | 4/2013 | Tyagi | G06T 7/60 382/103 |
| 2013/0301030 | A1* | 11/2013 | Hulm | G01S 7/4861 356/4.01 |
| 2015/0049911 | A1* | 2/2015 | Doettling | G06V 10/255 382/103 |
| 2015/0085082 | A1* | 3/2015 | Zierke | H04N 13/243 348/48 |
| 2015/0235351 | A1 | 8/2015 | Mirbach et al. | |
| 2015/0294483 | A1 | 10/2015 | Wells et al. | |
| 2015/0332463 | A1* | 11/2015 | Galera | G06V 40/103 382/103 |
| 2016/0012283 | A1* | 1/2016 | Mitoma | G06V 20/58 382/103 |
| 2016/0040827 | A1* | 2/2016 | Merx | F16P 3/142 700/79 |
| 2016/0104046 | A1* | 4/2016 | Doettling | F16P 3/142 382/103 |
| 2016/0148069 | A1* | 5/2016 | Song | G06T 7/593 348/46 |
| 2016/0375640 | A1* | 12/2016 | Cho | B29C 64/393 425/141 |
| 2017/0030708 | A1* | 2/2017 | Albert | G01S 17/87 |
| 2017/0032220 | A1* | 2/2017 | Medasani | G06V 20/653 |
| 2017/0214902 | A1* | 7/2017 | Braune | H04N 13/271 |
| 2017/0261603 | A1* | 9/2017 | Jachmann | G01S 17/08 |
| 2018/0204090 | A1* | 7/2018 | Konishi | G06T 1/60 |
| 2018/0209122 | A1* | 7/2018 | Kiyota | H04N 7/181 |
| 2018/0227575 | A1* | 8/2018 | Wu | G06T 5/002 |
| 2019/0101623 | A1* | 4/2019 | Galera | G01S 17/88 |
| 2019/0236796 | A1* | 8/2019 | Blasco Claret | G06T 7/557 |
| 2019/0385430 | A1* | 12/2019 | Criado-Perez | G08B 13/196 |

FOREIGN PATENT DOCUMENTS

| | | |
|---|---|---|
| EP | 2819109 A1 | 12/2014 |
| EP | 2854106 A1 | 4/2015 |
| EP | 3200122 A1 | 8/2017 |

OTHER PUBLICATIONS

European Search Report dated Nov. 19, 2018 corresponding to application No. 18173619.0-1207.

* cited by examiner

SECURING A MONITORED ZONE COMPRISING AT LEAST ONE MACHINE

The invention relates to a safe optoelectronic sensor, in particular a 3D sensor, for securing a monitored zone comprising at least one machine, wherein the sensor has at least one light receiver for generating a received signal from received light from the monitored zone and a control and evaluation unit that is configured to determine distances from objects in the monitored zone from the received signal, and to treat gaps, i.e. safety relevant part regions of the monitored zone in which no reliable distance can be determined, as an object at a predefined distance. The invention further relates to a method of securing a monitored zone comprising at least one machine, wherein a received signal is generated from received light from the monitored zone and the received signal is evaluated to determine distances from objects in the monitored zone, with gaps, i.e. safety relevant part regions of the monitored zone in which no reliable distance can be determined, being treated as an object at a predefined distance.

It is the primary goal of safety engineering to protect persons from hazard sources such as, for example, machines in an industrial environment represent. The machine is monitored with the aid of sensors and accordingly, if a situation is present in which a person threatens to come dangerously close to the machine, a suitable securing measure is taken. 3D sensors are inter alia used for the monitoring. They initially include 3D cameras in different technologies, for example stereoscopy, triangulation, time of flight, or evaluation of the interference of passive two-dimensional patterns or of projected illumination patterns. Such 3D sensors, in contrast to a conventional two-dimensional camera, record images that include distance values or depth values in their pixels. These depth-resolved or three-dimensional image data are also called a depth map. Laser scanners are furthermore known that scan in two directions or in all three directions and that likewise detect three-dimensional image data over the respective scanning angles and the measured distance. The higher instrument and evaluation effort for generating three-dimensional image data in comparison with a two-dimensional image detection is justified by the additional information in a number of applications.

Sensors used in safety technology or for the protection of persons have to work particularly reliably and must therefore satisfy high safety demands, for example the standard ISO 13849 for safety of machinery and the machinery standard IEC61496 or EN61496 for electrosensitive protective equipment (ESPE). To satisfy these safety standards, a series of measures have to be taken such as a secure electronic evaluation by redundant, diverse electronics, functional monitoring, or special monitoring of the contamination of optical components. It is typically required in safety technological applications that an object having a specific minimum size or specific minimum dimensions is reliably recognized. This property is called a detection capacity.

The common securing concept provides that protected fields are configured that may not be entered by operators during the operation of the machine. If the sensor recognizes an unauthorized intrusion into the protected field, for instance a leg of an operator, it triggers a safety-directed stop of the machine.

There is an increasing desire for closer cooperation with persons (HRC, human-robot collaboration) in the safety-engineering monitoring of robots. Relevant standards in this connection are, for example, ISO 10218 for industrial robots or ISO 15066 for collaborative robots. Protected fields and safety distances should be as small as possible in HRC and should possibly even be configured in a situation-adapted manner, naturally with the proviso that safety is maintained. Standards ISO 13854, ISO 13855, and ISO 13857 deal with the establishment of safety distances.

An evaluation of objects and machines with respect to speed and to mutual distance is called "speed and separation monitoring" in said robot standards. Safe monitoring sensors such as laser scanners or 3D cameras, however, do not support this. They still work with the typical protected fields and they only deliver a binary shutdown signal whether a protected field is infringed or not. Safety is admittedly ensured in this manner, but not particularly flexibly and also frequently with unnecessary safety overheads and thus restrictions of availability since the protected fields are configured for worst case scenarios and not the actual current situation.

The basic requirement for a securing is the reliable detection of all the object in the environment of a danger source that can be considered as a person or as a body part. This is, however, a very high demand with 3D sensors. Depending on the technology of the 3D sensor, measurement errors at edges, dark objects, metal regions, or contourless regions that can result in unsafe depth estimates, so-called defects, gaps, or holes of the detection are problematic, for example. In the object detection such gaps are as a precaution treated as the foreground and thus as an object due to a lack of better knowledge.

Since the sensor is not capable of detection in the shaded region behind an object, the evaluation should deal with the projective shadow behind an object as if the total projective shadow belonged to the object. This also applies accordingly to gaps for which, however, no valid distance value is present. The consequence is that gap are considered as objects at a distance of zero, that is directly in front of the sensor, and consequently that the total sight rays of the gap are treated as an object. This then admittedly provides the required safety, but is an unfavorable overestimation of the degree of the gap by assuming the worst case.

EP 2 275 990 B1 deals with gaps in the depth map and actually selects the conservative approach just described. A safety directed shutdown command takes place when there are gaps or when there are contiguous pixel regions without gaps that are each larger than the smallest object to be detected, with the size of a gap being projected to the margin under the assumption of the worst case. This margin in the worst case is directly in front of the sensor.

EP 2 819 109 A1 discloses a 3D sensor that recognizes objects from a minimum size onward in a detection field. To correctly take account of the projective geometry of a stereo camera, regions of the depth card are compared with suitably selected templates. Gaps here are treated like an object structure directly at the reception optics. In addition in EP 2 819 109 A1, the object detection takes place in a direct link with detection fields. This is accordingly unsuitable for a safety concept not based on protected fields.

U.S. Pat. No. 7,925,077 B2 discloses a method of estimating disparities for the evaluation of a stereo camera. Various filters are proposed here to improve the estimate and make it plausible. How to deal with gaps that nevertheless remain is, however, not discussed, and by no means from a technical safety perspective.

EP 3 200 122 A1 discloses a 3D sensor with a safe recognition of objects in which the depth map is evaluated by a fine and by a coarse detection capability. Finely detected objects within an environment of a coarsely detected object are assigned to it, isolated finely detected objects are ignored as interference. This admittedly makes it possible to filter small objects determined downstream as not safety relevant. Gaps here are, however, treated as objects and therefore have to be assumed as located directly in front of the sensor as a precaution.

The approach is additionally pursued in the literature to repair or fill gaps in the depth maps. In U.S. Pat. No. 9,094,660 B2, for instance, the resolution is first scaled down until the remaining gaps or their sizes fall under a threshold. The lower resolution image is then again extrapolated to the high resolution and gaps in the original image are filled with image data of the extrapolated image. Such repairs can, however, hardly be considered in safety engineering since the life and health of persons may not be made dependent on assumptions on the missing image information. For example a gap that apparently has to be filled can in reality correspond to a body part of a person in very dark clothing that may not be overlooked at all in the evaluation.

A method in accordance with US 2015/0235351 A1 generates two filtered depth maps from one depth map and compiles an improved depth map therefrom. The filters can, however, also only distribute the information present differently by means of interpolation through specific filter kernels. Such a utilization of proximity relationships is by all means suitable to considerably improve the appearance of a depth map. Such filters are, however not sufficient for the protection of persons, at least not alone, because it cannot be guaranteed that the safety-directed reaction is actually only suppressed when there is no risk.

The safety standard IEC61496 already mentioned above also deals with protection against reach overs. A required height of 1400 mm for the upper edge of a protected field is specifically predefined for this purpose when the detection capability is >=70 mm; for all other cases a height of 2400 mm. These figures are very inflexible, on the one hand, since the smaller height of 1400 mm can only be used for comparatively coarse leg protection or body protection; with every detection capability finer than 70 mm, the addressed conservative 2400 mm are already decisive. In addition, these standard figures are a demand on protected fields; no relationship with a gap evaluation or defect evaluation of a sensor is established here.

It is therefore the object of the invention to enable an improved safe detection of the environment of a dangerous machine.

This object is achieved by a safe optoelectronic sensor, in particular a 3D sensor, and by a method of securing a monitored zone comprising at least one machine in accordance with the respective independent claim. The sensor is safe, that is, it is designed for a safety engineering application and satisfies the standards named in the introduction or corresponding standards to secure a hazardous machine. Received light from the monitored zone is detected by a light receiver and a received signal is acquired from it. The configuration of the light receiver and thus the kind of received signal depend on the sensor. The light receiver is an image sensor, for example, and the information read out of the pixels is called a received signal in sum.

The received signal is evaluated in the sensor to also detect distances of the sensor from objects also called depth values, that is, for example, a cloud of measured points, in particular a 3D point cloud, or a depth map. The distances initially measured with respect to the sensor are often evaluated in different coordinates, for instance as a height above the ground, so that no difference is made linguistically between the spacing from the sensor and the height above the ground at many points. The evaluation also comprises a technical safety evaluation of defects, holes, or gaps, that is part regions of the monitored zone, in which no distance can be gained, or at least no distance can be gained with sufficient reliability. Such gaps are treated as a foreground and thus as an object; it is therefore assumed as a precaution that every gap hides an object. In a depth map, for example, the pixels are set to the predefined distance in the gap; with a 3D point cloud, measured points are added at the predefined distance over the extent of the gap. Gaps only have to be taken into consideration in safety relevant part regions of the monitored zone; the actually detectable monitored zone is possibly greater, but a working region is configured therein and it is fixed by this boundary that no safety monitoring has to take place outside it.

The invention starts from the basic idea of no longer keeping to the conventional maximally conservative predefined distance of zero directly in front of the sensor. The gap namely generates a particularly large projective shadow under this assumption. A distance is instead predefined in the gap in accordance with the invention for the fictitious object assumed there that corresponds to a height to be secured against reach over. Contrary to the previously pursued solution, this is namely already sufficient to ensure safety and in particular to correctly secure a safeguard against reach over in accordance with ISO 13855:2010 or with comparable safety standards.

The invention has the advantage that the availability of the sensor is improved. Safety is also already ensured by the conventional predefined distance directly in front of the sensor. However, unnecessary safety directed reactions can occur due to the maximum underestimation of the distance. It is therefore desirable for reasons of availability to underestimate the distance as little as possible; however, at the same time, the safety satisfying the standard naturally still has to be maintained and it is therefore simultaneously absolutely necessary never to overestimate the distance. A predefined distance at the height up to which protection is provided against reach over represents an optimum here.

The control and evaluation unit is preferably configured to determine a degree of reliability on the determination of distances and to treat safety reliable part regions as gaps and thus objects at the predefined distance in which part regions the degree of reliability falls below a reliability threshold. For example, in a disparity estimate of a stereo camera, a quality measure for the respective correlation and thus for the resulting distance value is simultaneously produced. Gaps are then not only part regions of the monitored zone in which no distances were able to be detected at all, but also those in which the estimate is considered as not sufficiently reliable. The gaps that are assumed as fictitious objects run through a recognition, preferably in the same way as actually detected objects, of whether they are also safety relevant objects. For example, small gaps and objects can be eliminated, a body model can be used for filtering, or finely detected objects are as in EP 3 200 122 A1 assigned to a neighboring coarsely detected object or isolated finely detected objects are ignored.

The predefined distance is preferably fixed using a maximum body size, in particular to 2400 mm. This is still a very conservative figure for the predefined distance. It is also conceivable that a tall person extends his fingertips up to this level, but does not reach over the machine in an undiscovered manner at this height. Since the sensor is preferably used with a bird's eye view in an industrial environment with large ceiling heights, a lot is already gained with the height corresponding to a maximum body size or to a generous figure for it of 2400 mm with respect to a predefined distance directly in front of the sensor, that is practically at ceiling height.

The sensor is preferably configured for a detection capability in which objects are safely detected from a minimum size onward. The detection capability is a specified suitability of a sensor that is safe in the sense of the introductory standards or comparable standards to securely detect objects of a minimum size in the total monitored zone. The corresponding configuration of the sensor relates to its design, that is to its optics, its light receiver, and further possible components, not yet named, such as lighting, and to the secure evaluation. The detection capability in the first instance does not preclude smaller objects from also being detected. However, protection is not guaranteed for objects that are smaller than the minimum size; for example, a finger is not reliably detected with a sensor designed for arm protection. Objects smaller than the minimum size are therefore possibly excluded in the evaluation by means of filtering. It is also possible to select a minimum size above the detection capability, that is not to utilize a resolution provided per se. Numerical examples can be given as 14 mm for finger protection or in the range from 30-80 mm for the protection of extremities, in particular 55 mm for upper arm protection.

The sensor is preferably configured for a detection capability of 70 mm or more and the height for securing against reach over amounts to 1400 mm. This takes account of the standard requirements of in particular IEC61496 or comparable standards for protection against reach over with a coarse detection capability having leg or body protection.

The sensor is preferably configured for a detection capability of smaller than 70 mm and the height for securing against reach over amounts to between 1400 mm and 2400 mm depending on the detection capability. Values are genuinely meant between said limits here. A height of only 1400 mm can only be used with a coarse detection capability. If the specific figures of IEC61496 are used, only the jump to the comparatively conservative height of 2400 mm remains with a coarser detection capability. With a more exact observation of the standard requirements that is carried out further below, it is found that a standard satisfying adaptation of the height is possible in dependence on the specific finer detection capability with an availability improved accordingly with respect to a height of 2400 mm. The above-presented considerations and parameters enter into the minimally required safety margins in accordance with the standards for the determination of the safety distance from the respective hazard zone.

The sensor is preferably configured for a detection capability of 55 mm and the height for securing against reach over amounts to 2000 mm. This is an exemplary, but relevant special case of a height between 1400 and 2400 mm predefined in dependence on a detection capability of smaller than 70 mm. A considerably optimized specification to the assumed distance in gaps is thus possible for elbow protection or upper arm detection at 55 mm, namely in comparison with a height of 2400 mm generally satisfying the standard corresponding to any desired detection capability in accordance with EN 61496 and in particular with a distance directly in front of the sensor. As all figures, the 2000 mm are a minimum value; a larger height means an underestimate which always satisfies the standard, but with which however, the optimum is departed from and the availability is thus impaired. The height of 2000 mm for the detection capability of 55 mm is derived by way of example from the standard ISO 13855 below in the description. It is found here that the 2000 mm can still be fallen short of by a few centimeters. If this buffer of specifically 43 mm is, however, actually utilized to the full, there is no further tolerance without losing safety. A height of 1.957 m that has to be observed exactly to the millimeter would be less practical and it is therefore given as 2000 mm with the understanding of a still present tolerance.

The control and evaluation unit is preferably configured to determine the shortest distance between at least a hazard zone configured for the machine to be secured and the objects detected in the monitored zone and to provide it at an output interface that is safe in the sense of the named or comparable standards. It must be noted here that the distance previously designated a distance from the sensor or depth value, while the shortest distance now explained relates to a distance between the hazard zone and the object. Conventionally, only a binary signal is output via such an output interface as to whether a protected field reach over is present (OSSD, output signal switching device). In accordance with this preferred embodiment, protected fields are no longer monitored and binary securing signals are also no longer generated and output by the sensor itself. Instead, the information required for this is provided in a safe, very compact, and easily accessible manner. The respectively current shortest distance is provided instead of the previously customary binary securing signal at the safe output interface, that is consequently no longer designed as an OSSD, for a connected control. This control, for instance the higher ranking control of a robot cell or also the control of the robot itself can very simply determine with respect to the shortest distance whether there is a hazard and takes over the actual securing function itself.

In this respect, work or the cooperation with machines becomes substantially more flexible in design and a fast, individual response to humans in the environment of the machine is made possible. An intrusion into a protected field as a rule only allows an emergency stop since protected fields are defined exactly such that in such a case there is a risk of an accident that is no longer differentiated due to the binary shutdown signal. However, milder intrusions in the process routine that avoid a time-intensive emergency stop together with a restart and that allow the process routine to continue to run without interference where possible or that integrate the approach of a human into the process routine are also possible by monitoring shortest distances. Worksteps of the machine can be replanned in good time here.

The control and evaluation unit is preferably configured to provide at least one piece of additional information at the output interface, with the additional piece of information comprising at least one further shortest distance from other sections of the next object or other objects, an object position, a direction of movement, a speed, an object envelope, or an object cloud. A differentiated evaluation is thus made possible at a control connected to the output interface. It is, for example, conceivable that it is not a slow next object that represents the greatest hazard, but rather a fast somewhat more remote object. The at least one additional shortest distance should relate to another object or to at least one clearly separate other object region such as another arm since otherwise only direct adjacent points from the shortest distance would be considered whose additional information contributes little new. Object positions are here preferably representative, for instance an object focus or that object point from which the shortest distance was calculated. It is, however, also conceivable to output bounding boxes or the 3D point cloud of the object. All these pieces of additional information are preferably intermediate results that were anyway detected when locating the shortest distance or are parameters that can be easily derived therefrom that do not substantially increase the effort.

The sensor is preferably a 3D camera. A laser scanner is also a 3D sensor since it produces 3D point clouds that are limited to one scanning plane with a classical laser scanner. This restriction with a laser scanner is lifted by a scan moving in elevation or by a plurality of scanning beams set into elevation. A 3D camera is, however, preferred that can initially use any known technology such as a time of flight principle with a direct time of flight measurement of light signals or a phase measurement or a distance estimate from brightnesses or focal positions (DFF depth from focus; DFD, depth from defocus). The 3D camera particularly preferably uses a triangulation principle, however, in which two camera images of a moving camera or of a stereo camera are correlated with one another or alternatively an illumination pattern is correlated with a camera image to thus estimate disparities and to determine distances therefrom.

The method in accordance with the invention can be further developed in a similar manner and shows similar advantages in so doing. Such advantageous features are described in an exemplary, but not exclusive manner in the subordinate claims dependent on the independent claims.

The objects are here preferably detected with any desired detection capability and the predefined distance from the sensor is fixed with reference to a maximum body size, in particular to 2400 mm while taking account of outstretched arms, or the objects are detected with a detection capability of 70 mm or more and the height for securing against reach over amounts to 1400 mm, or the objects are detected with a detection capability of smaller than 70 mm, and the height for securing against reach over amounts to between 1,400 mm and 2,400 mm in dependence on the detection capability, in particular 2000 mm with a detection capability of 55 mm.

The shortest distance between at least one hazard zone configured for the machine to be secured and the objects detected in the monitored zone is determined and is output to a control. The control is superior to the sensor and to the monitored machine or machines or it is the control of the machine itself. The control evaluates the distances delivered by the sensor and initiates a safety-directed response where necessary. Examples for a securing are an emergency stop, a braking, an evading, or a putting into a safe position. It is conceivable to specify a fixed minimum distance that is, for instance, determined under worst case assumptions for speeds or from known or measured trailing distances. Dynamic safety distances, inter alia in dependence on the current speed of the machine and of the object, are also conceivable. Data of the control of the machine can flow into the safety evaluation. It is also possible to use a plurality of sensors that complement one another in their monitored zones and/or in their perspectives.

Figure 2:
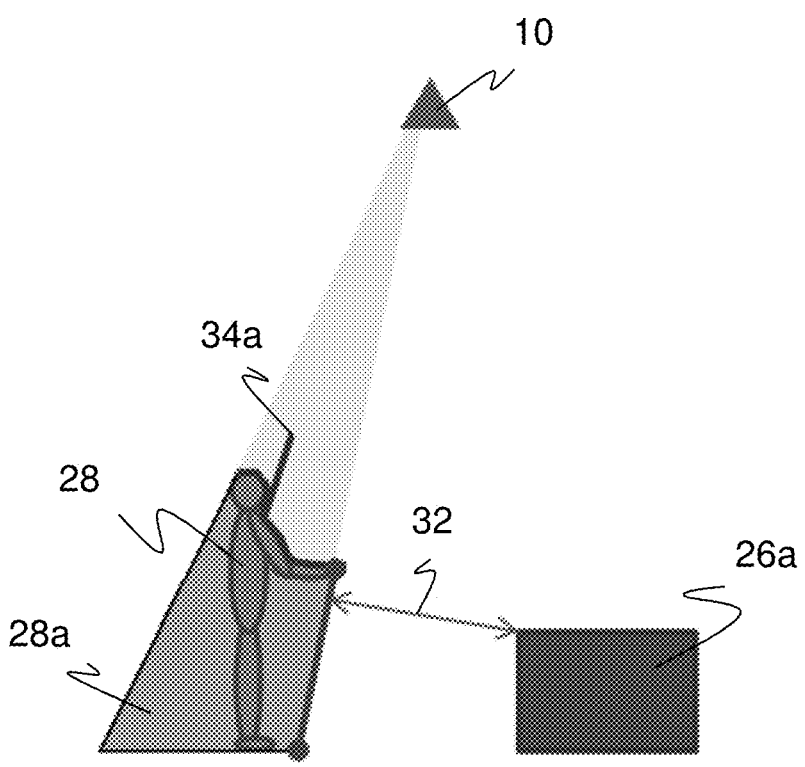
Figure 3:
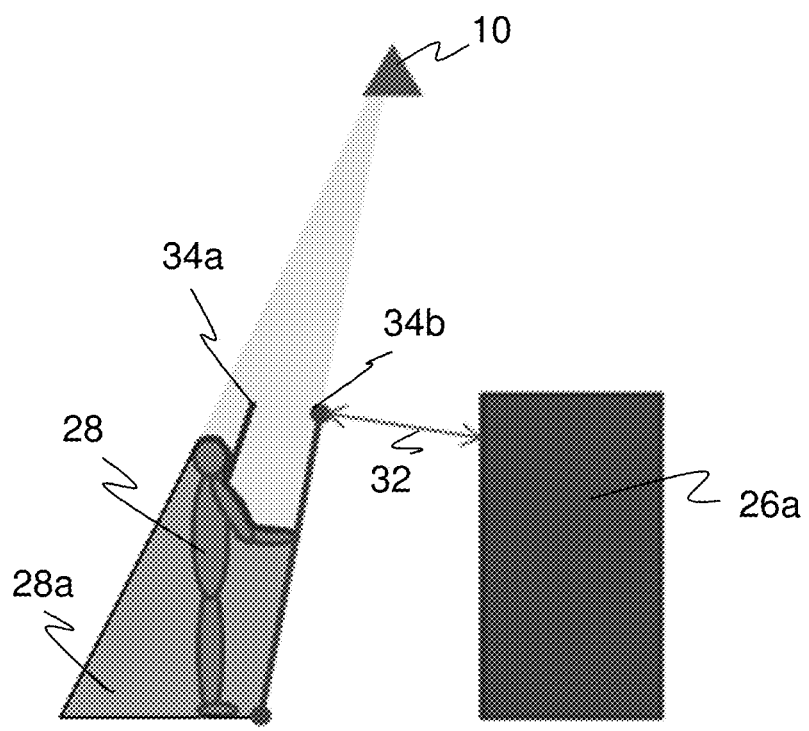

The invention will be explained in more detail in the following also with respect to further features and advantages by way of example with reference to embodiments and to the enclosed drawing. The Figures of the drawing show in:

FIG. 1 a schematic three-dimensional representation of a 3D camera and its monitored zone;

FIG. 2 a schematic side view of an exemplary detection situation of a person in the vicinity of a hazard zone; and FIG. 3 a schematic side view similar to FIG. 2, but with a higher hazard zone.

Figure 4:
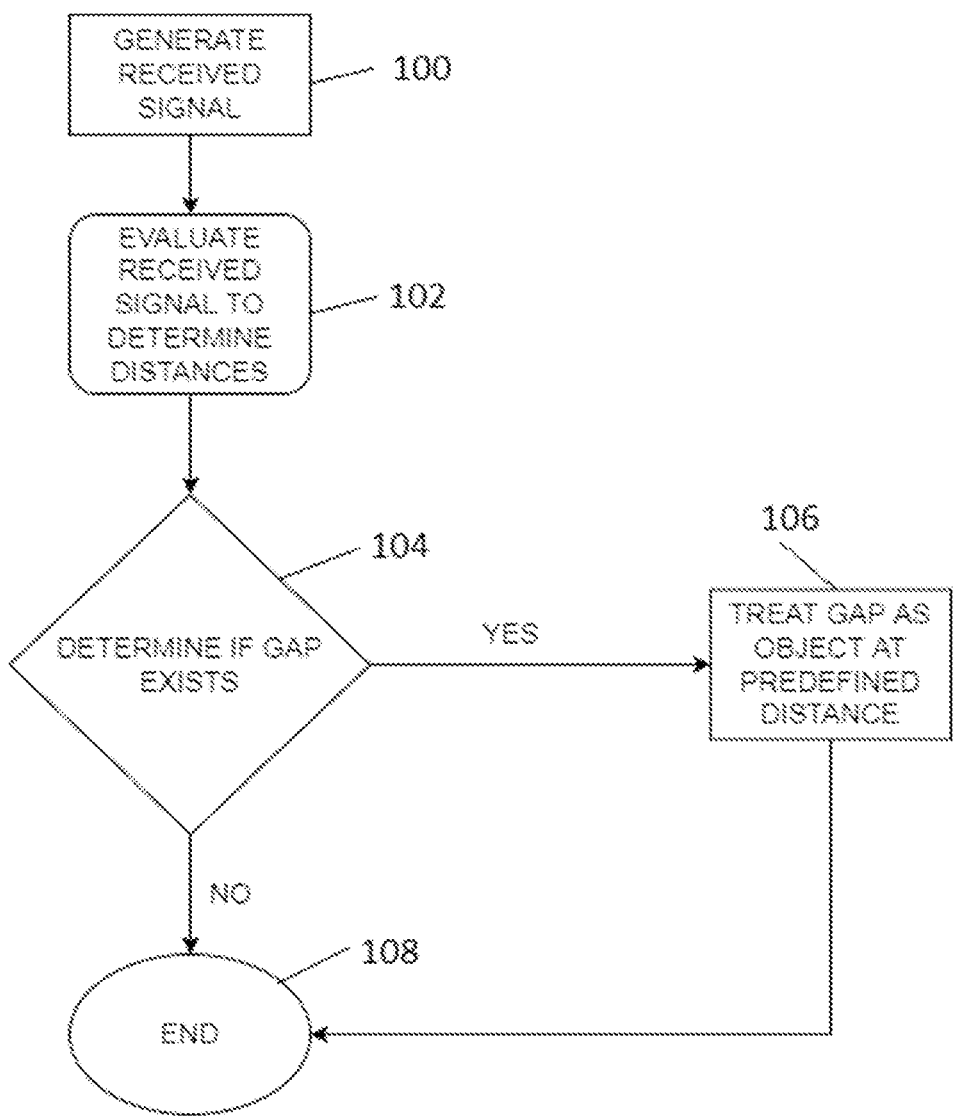

FIG. 4 a flow chart showing method steps of a method of securing a monitored zone.

FIG. 1 shows the general design of a 3D stereo camera 10 for recording a depth map in a schematic three-dimensional representation. The stereo camera 10 is only an example for a sensor in accordance with the invention with reference to which the detection of 3D image date will be explained. Different 3D cameras with detection principles such as a correlation of image and projected illumination patterns or determination of the time of flight and laser scanners would equally be conceivable.

To detect the spatial zone 12, two camera modules 14a, 14b are mounted at a known fixed distance from one another therein and each take images of a spatial zone 12. An image sensor 16a, 16b, usually a matrix-type imaging chip, is provided in each camera and records a rectangular pixel image, for example a CCD or a CMOS sensor. The two image sensors 16a, 16b together form a 3D image sensor for detecting a depth map. One objective 18a, 18b having an optical imaging system is associated with each of the image sensors 16a, 16b which in practice can be realized as any known imaging lens. The maximum angle of view of these optics is shown in FIG. 1 by dashed lines which each form a pyramid of view 20a, 20b.

An illumination unit 22 is provided between the two image sensors 16a, 16b to illuminate the spatial zone 12 with a structured pattern. The stereo camera shown is accordingly configured for active stereoscopy in which the pattern also imparts evaluable contrasts everywhere to a scene that is structure-less per se. Alternatively, no illumination or a homogeneous illumination is provided to evaluate the natural object structures in the spatial one 12, which as a rule, however, results in additional aberrations.

An evaluation and control unit 24 is connected to the two image sensors 16a, 16b and the lighting unit 22. The control and evaluation unit 24 can be implemented in the most varied hardware, for example digital modules such as microprocessors, ASICS (application specific integrated circuits), FPGAs (field programmable gate arrays), GPUs (graphics processing units) or mixed forms thereof that can be distributed over any desired internal and external components, with external components also being able to be integrated via a network or cloud provided that latencies can be managed or tolerated. Since the generation of the depth map and its evaluation is very computing intensive, an at least partly parallel architecture is preferably formed.

The control and evaluation unit 24 generates the structured illumination pattern with the aid of the illumination unit 22 and receives image data of the image sensors 16a, 16b. The control and evaluation unit 24 generates a received signal (step 100 of FIG. 4) and evaluates the received signal to determine distances (step 102). The control and evaluation unit 24 calculates the 3D image data or the depth map of the spatial zone 12 from these image data with the aid of a stereoscopic disparity estimate. The total detectable spatial zone 12 or also the working region can be restricted via a configuration, for example to mask interfering or unnecessary regions.

An important safety engineering application of the stereo camera 10 is the monitoring of a machine 26 that is symbolized by a robot in FIG. 1. The machine 26 can also be substantially more complex than shown, can consist of a number of parts, or can actually be an arrangement of a plurality of machines, for instance of a plurality of robots or robot arms. The control and evaluation unit 24 checks where an object 28, shown as a person, is located with respect to the machine 26. A very short distance of an object 28 from the machine 26 is output via a safe interface 30, either directly to the machine 26 or to an intermediate station such as a safe control. The shortest distance that represents an output value may not be confused with the distance of the stereo camera 10 from object points in the spatial zone 12, that is with the depth values. The stereo camera 10 is preferably failsafe in the sense of safety standards such as those named in the introduction.

The control connected to a safe interface 30, whether it is a higher ranking control or that of the machine 26, evaluates the shortest distance for satisfying a safety function, for example a speed and separation monitoring in accordance with ISO/TS 15066 and for this purpose compares the shortest distance with a required safety distance, for instance in accordance with ISO 13855. In the hazard case, a safety-directed response is initiated in order, for example, to stop or brake the machine 26 or to cause it to evade. Whether this is necessary can, in addition to the shortest distance, depend on further conditions such as the speeds or the directions of movement or the nature of the object 28 and the machine zone 26 of the impending collision. Alternatively to the two-stage output of shortest distances and their downstream evaluation, a conventional protected field evaluation in the stereo camera 10 or in a control connected thereto with the output of a binary safety directed signal is conceivable.

FIG. 2 shows a schematic side view of a monitored situation. The machine 26 is here advantageously modeled as a hazard zone 26a. It is a spatial zone in which the machine 26 carries out work movements in a respective time period. The hazard zone 26a can surround the machine 26 with a little spacing to leave sufficient clearance for the work movements. In addition, it is advantageous for the calculations to define geometrically simple hazard areas 26a such as parallelepipeds or spheres, for which purpose certain empty spaces can then be accepted. A plurality of hazard zones 26a surround a plurality of machines 26 and/or a plurality of moving part sections of a machine 26 as required. Hazard zones 26a can be rigid and can comprise all conceivable work movements. Alternatively, respective hazard zones 26a are defined for part sections of the work movement that are utilized in a sequence corresponding to the process and that are smaller and are better adapted.

The hazard zone 26a itself is preferably considered free of objects 28 to be detected or rather as blocked by the machine 26. In fact, depending on the bounding box that models the machine 26 as a hazard zone 26a, there would easily be space for objects 28 therein. The machine 26 itself naturally also forms an object 28 that is initially detected by the stereo camera 10. All this is, however, preferably intentionally ignored in the evaluation and the hazard zone 26a is modeled as an empty block free of objects 28 to simplify the monitoring and the determination of shortest distances since the dynamics of the machine 26 within the hazard zone 26a thus play no role. This is unproblematic from a safety engineering aspect since each object is recognized in good time when it approaches the hazard zone 26a.

The control and evaluation unit 24 continuously calculates the shortest distance between the hazard zone 26a and the object 28, with respective projective shadows preferably being taken into account. For this purpose, the minimum of the distances between the points in a region 28a shaded by the object 28 and the points of the hazard zone 26a around the machine 26 is optionally also determined together with the projective shadow. The resulting shortest distance 32 is drawn by an arrow in FIG. 2 that connects the closest point of the shaded region 28a to the closest point of the hazard zone 26a. This shortest distance is provided cyclically or acyclically at the safe interface 30. Typical output rates are multiple times a second; however, a more infrequent updating is also conceivable depending on the required and possible response time of the stereo camera 10. A higher ranking control connected to the safe interface 30, in particular that of the machine 28, then plans the next workstep again, where necessary in dependence on the shortest distance, reduces the work speed or, where necessary, stops the machine 26 in a safety directed manner so that the required safety distance between human and machine is always maintained.

To satisfy the sensor function, that is in particular the calculation and output of the shortest distance from a configured hazard zone 26a, a distance value or depth value has to be determined for each valid object detection. A possible representation is a so-called detection depth map whose pixels include a distance value wherever a valid object 28 was recognized at the respective lateral position. In this connection, valid means that the object 28 is also still considered relevant after filtering with a minimum size, a body model, a relationship with a coarsely detected object such as in EP 3 200 122 A1, or the like, Regions in which no valid object 28 was recognized are empty in the detection depth map, Problematic regions that are alternatively also called defects, holes, or gaps have to be considered in the detection depth map, however, and indeed as (fictitious) objects at a predefined spacing from the stereo camera 10. It will be explained in the following how this predefined distance is simultaneously selected as satisfying the standard, i.e., maintaining safety, and to optimize the availability as far as possible from the stereo camera 10. These statements apply equally when another representation is selected instead of a detection depth map. If a gap is determined to exist (step 104 of FIG. 4), then the gap is treated as an object at a predefined distance (step 106). If a gap is not found, then the process ends (step 108) and may begin again.

Conventionally, a distance of zero is assigned to the pixels in a gap directly in front of the stereo camera 10. However, this means that the total sight ray up to the floor can be used for the calculation of shortest distances. The availability is consequently improved when a distance that is as large as possible from the stereo camera 10 is predefined; in other words, in the advantageous perspective from above shown, a height above a base surface that is as small as possible. To nevertheless ensure safety, a height is simultaneously selected that is sufficient to prevent a reach over, for example in accordance with ISO 13855:2010. Shorter sight rays then result, as shown in FIG. 2 for an exemplary gap 34a.

In accordance with the invention, gaps 34a are therefore placed at the lowest still safe height. The sight rays thereby receive a minimal length and the availability is maximized.

FIG. 3 shows a schematic side view similar to FIG. 2, but with a higher hazard zone 26a. Particularly with higher hazard zones 26a, the height assigned to gaps 34a can be decisive for the calculation of the shortest distance. In FIG. 2, the shortest distance 32 from a point is in the shaded region 28a.

In FIG. 3, a further gap 34b was added for illustration at a margin facing the hazard point 26a and the shortest distance 32 is here from the gap 34b or from its sight ray. If a larger height were assigned to the gap 34b, an even smaller shortest distance 32 would result, which corresponds to a higher danger and which impairs availability. It can simultaneously be recognized that the lower hazard zone 26b in FIG. 2 would still have the shortest distance 32 from the shaded region even on addition of a further gap 34b at the margin. This again emphasizes that the height assigned to a gap 34*a-b* above all has effects on the availability with high hazard points 26*a*.

It can be illustratively established with a body model that it has to be possible to assign a height to a gap 34*a-b* that is smaller than a distance of zero from the stereo camera 10 while maintaining safety. The detection capability of the stereo camera 10 determines which objects 28 still have to be reliably recognized as safety relevant. The detection capability for elbow protection amounts to d=55 mm and for wrist protection to d=40 mm, for example. A body model specifies the maximum size and the maximum length of the extremities and the person always stands on a defined ground area. A maximum height above the ground area results from this in which the corresponding body parts are still expected or can even reach over and therefore have to be recognized at all. It is sufficient if the distance value for gaps 34*a-b* is set to this height.

The required height can, however, also be derived from the safety standards or can be validly established herewith. ISO 13855 and IEC/TS 61496 4-3 are used here. Corresponding provisions are also to be expected in an alternatively valid current or future standard.

Accordingly, $$S_0 = (K \times T) + C + C_{tz} + d$$

applies to the minimum safety distance $S_0$ from the danger zone, where

C supplement in dependence on the detection capability, C=f (d), $C_{tz}$ supplement for system tolerances, d detection capability, and K×T term of the movement.

The system tolerances $C_{tz}$ should be ignored at this point and a detection capability of d=55 mm should be assumed as an example. After an estimate based on data from B. Flügel, H. Greil, K. Sommer, Anthropologischer Atlas, Verlag Tribüne Berlin 1986, ISBN 3-7303-0042-3, the supplement C=12 d-272 mm thus becomes c=388 mm for d=55 mm with a detection capability of 40 mm <d≥55 mm.

It should now be ensured in the sense of the standard that $C_{RO}$<C+d, where $C_{RO}$ is the supplement for protection against reach over (RO). This condition results from the fact that $S_{RO}$<S0 should apply, where $S_{RO}$=K×T+$C_{RO}$.

Table 1 of ISO 13855:2010 lists different values for $C_{RO}$ for combinations of the height a of the hazard zone and of the height b of the detection field. To be able to monitor hazard points of any desired height, the maximum of $C_{RO}$ for all a is considered here with a given b. Alternatively, a table or a calculation rule could also be stored to take account of the dependence a for the specifically configured hazard zones 26*a*.

At b=2000 m, the maximum $C_{RO}$=400 mm. C+d is thus equal to 443 mm >$C_{RO}$ and a height of 2000 mm for a detection capability of d=55 mm is thus safe.

The maximum height of the detection region means that no objects 25 above this have to be detected or only their masking 28*a* within the detection region is relevant. It can, however, be concluded from this that objects 28 having an unknown distance, that is gaps 34*a-b* together with their masking, only have to be considered up to a maximum of this height. The height derived from the standard ensures that the hazard point 26*a* can no longer be reached if a detection of the object 28 up to this height, or alternatively a projection of a gap 34*a-b*, is carried out to this height.

The invention claimed is:

1. A safe optoelectronic sensor for securing a monitored zone comprising at least one machine, wherein the safe optoelectronic sensor has at least one light receiver for generating a received signal from received light from the monitored zone and a control and evaluation unit that is configured to determine distances from objects in the monitored zone from the received signal, and to treat a gap as an object at a predefined distance, with the predefined distance corresponding to a height for securing against reach over, wherein a gap comprises a safety relevant part region of the monitored zone in which no distances are determined from the objects in the monitored zone within a degree of reliability below a predetermined reliability threshold, the control and evaluation unit being further configured to determine the degree of reliability.

2. The safe optoelectronic sensor in accordance with claim 1, wherein the safe optoelectronic sensor is a 3D sensor.

3. The safe optoelectronic sensor in accordance with claim 1,
wherein the predefined distance is fixed with reference to a maximum body size.

4. The safe optoelectronic sensor in accordance with claim 3,
wherein the maximum body size is 2400 mm.

5. The safe optoelectronic sensor in accordance with claim 1,
wherein the safe optoelectronic sensor is configured for a detection capability in which objects are reliably detected from a minimum size onward.

6. The safe optoelectronic sensor in accordance with claim 1,
wherein the safe optoelectronic sensor is configured for a detection capability of 70 mm or more and the height for securing against reach over amounts to 1400 mm.

7. The safe optoelectronic sensor in accordance with claim 1,
wherein the safe optoelectronic sensor is configured for a detection capability of smaller than 70 mm and the height for securing against reach over amounts to between 1400 mm and 2400 mm depending on the detection capability.

8. The safe optoelectronic sensor in accordance with claim 1,
wherein the safe optoelectronic sensor is configured for a detection capability of 55 mm and the height for securing against reach over amounts to 2000 mm.

9. The safe optoelectronic sensor in accordance with claim 1,
wherein the control and evaluation unit is configured to determine the shortest distance between at least one hazard zone configured for the machine to be secured and the objects detected in the monitored zone and to provide it at a safe output interface.

10. The safe optoelectronic sensor in accordance with claim 1,
wherein the safe optoelectronic sensor is a 3D camera.

11. The safe optoelectronic sensor in accordance with claim 10,
wherein the 3D camera is a stereo camera.

12. A method of securing a monitored zone comprising at least one machine, wherein a received signal is generated from received light from the monitored zone and the received signal is evaluated to determine distances from objects in the monitored zone, with a gap being treated as an object at a predefined distance, with the predefined distance corresponding to a height for securing against reach over, wherein a gap comprises a safety relevant part region of the monitored zone in which no distances are determined from the objects in the monitored zone within a degree of reliability below a predetermined reliability threshold.

13. The method in accordance with claim 12,
wherein the objects are detected with any desired detection capability and the predefined distance is fixed with reference to a maximum body size, in particular to 2400 mm.

14. The method in accordance with claim 12, wherein the objects are detected with a detection capability of 70 mm or more and the height for securing against reach over amounts to 1400 mm.

15. The method in accordance with claim 12, wherein the objects are detected with a detection capability of smaller than 70 mm and the height for securing against reach over is, dependent on the detection capability, between 1400 mm and 2400 mm.

16. The method in accordance with claim 15,
wherein the height for securing against reach over is 2000 mm with a detection capability of 55 mm.

17. The method in accordance with claim 12,
wherein the shortest distance between at least one hazard zone configured for the machine to be secured and the objects detected in the monitored zone is determined and is output to a control.

* * * * *